(12) United States Patent
Howey

(10) Patent No.: US 9,097,228 B2
(45) Date of Patent: Aug. 4, 2015

(54) METHOD FOR ADJUSTING THE VALVE STROKE

(75) Inventor: Friedrich Howey, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 941 days.

(21) Appl. No.: 12/782,167

(22) Filed: May 18, 2010

(65) Prior Publication Data

US 2010/0294862 A1 Nov. 25, 2010

(30) Foreign Application Priority Data

May 19, 2009 (DE) .......................... 10 2009 003 208

(51) Int. Cl.
| F02M 61/16 | (2006.01) |
| F02M 47/02 | (2006.01) |
| F02M 63/00 | (2006.01) |
| F16K 31/06 | (2006.01) |
| B23P 19/06 | (2006.01) |
| G05D 17/00 | (2006.01) |
| G05D 17/02 | (2006.01) |

(52) U.S. Cl.
CPC ........... *F02M 61/168* (2013.01); *F02M 47/027* (2013.01); *F02M 61/161* (2013.01); *F02M 63/008* (2013.01); *F02M 63/0019* (2013.01); *F16K 31/0655* (2013.01); *B23P 19/065* (2013.01); *B23P 19/066* (2013.01); *F02M 2200/8092* (2013.01); *F02M 2547/003* (2013.01); *G05D 17/00* (2013.01); *G05D 17/02* (2013.01); *Y10T 29/4902* (2015.01); *Y10T 29/49075* (2015.01); *Y10T 29/49405* (2015.01); *Y10T 29/49407* (2015.01); *Y10T 29/49766* (2015.01); *Y10T 29/49767* (2015.01); *Y10T 29/49947* (2015.01)

(58) Field of Classification Search
CPC . F02M 47/027; F02M 61/161; F02M 61/168; F02M 63/008; F02M 2200/8092; F02M 2547/003; F16K 31/0655; B23P 19/065; B23P 19/066; G05D 17/00; G05D 17/02; Y10T 29/4902; Y10T 29/49075; Y10T 29/49405; Y10T 29/49407; Y10T 29/49766; Y10T 29/49767; Y10T 29/49947
USPC ............. 29/890.12, 890.121, 407.02, 407.03, 29/525.01, 607; 239/88, 96
See application file for complete search history.

(56) References Cited

U.S. PATENT DOCUMENTS

| 4,530,143 | A | * | 7/1985 | Casarcia | .................... 29/407.02 |
| 5,152,046 | A | * | 10/1992 | Abe | ....................... 29/407.02 |
| 5,215,270 | A | * | 6/1993 | Udocon et al. | ............. 29/407.02 |

FOREIGN PATENT DOCUMENTS

| EP | 0890730 A2 | 1/1999 |
| EP | 1707797 A1 | 10/2006 |

(Continued)

*Primary Examiner* — A. Dexter Tugbang
(74) *Attorney, Agent, or Firm* — Michael Best & Friedrich LLP

(57) ABSTRACT

A method for adjusting the valve stroke or a closing duration of a solenoid valve for actuating a fuel injector includes first screwing a magnet adapter nut in a first screwing course on an injector body until a target stroke for the valve stroke is attained at a first torque. Upon attainment of the target stroke at the first torque, a further rotation takes place, at a differential torque. Next, the magnet adapter nut is unscrewed until a torque is reliably undershot. After that, rescrewing of the magnet adapter nut takes place in a second screwing course until the target stroke is attained at a second torque.

18 Claims, 5 Drawing Sheets

(56) References Cited

FOREIGN PATENT DOCUMENTS

| | | | |
|---|---|---|---|
| EP | 1744054 A1 | 1/2007 | |
| EP | 1845256 A1 | 10/2007 | |
| JP | 03096657 A * | 4/1991 | ............ 239/88 X |
| WO | 03083286 A1 | 10/2003 | |

* cited by examiner

METHOD FOR ADJUSTING THE VALVE STROKE

CROSS-REFERENCE TO RELATED APPLICATION

This application is based on German Patent Application 10 2009 003 208.8 filed May 19, 2009.

BACKGROUND OF THE INVENTION

1. Field of the Invention

From German Patent DE 101 33 218 C2, a method and an apparatus for adjusting the magnet stroke in fuel injectors is known. According to DE 101 33 218 C2, the installation of a solenoid valve, in which an electromagnet is surrounded by a magnet sleeve is fixed in an opening in an injector body, is effected in that the magnet sleeve is received on the injector body by means of a magnet adapter nut, and an adjusting disk is disposed between the end face of the magnet sleeve and the injector body. First, a preadjustment of the stroke of an armature is made by means of an adjusting disk; a preselectable attraction torque is exerted on the magnet adapter nut upon tightening onto the injector cap, and elastic elements are embodied in the screw assembly that comprises the injector cap and the magnet adapter nut. During the tightening of the magnet adapter nut, the stroke travel of the armature is absorbed.

2. Description of the Prior Art

In installation methods currently used, the magnet adapter nut is screwed on with a constant rotational speed, while at the same time, the stroke and the closing duration of the solenoid valve are measured. The time that elapses from when the coil current is shut off until the valve element strikes the sealing seat is calculated as the closing duration. Measuring the closing duration partly replaces measuring the valve stroke, since the valve stroke, in certain types of injector, can no longer be measured in the installed state. It is then necessary that the change in the stroke or closing duration of the solenoid valve be virtually constant over time, at a constant rotational speed of the magnet adapter nut, so that the screwing device detects the attainment of the target stroke in good time and terminates the screwing operation. This condition is largely met, if the deformation is a purely elastic deformation. However, there is also the additional condition that the torque exerted be between a minimum value and a maximum value. The minimum value is defined by the fact that independent loosening at overly low breakaway torques must be prevented. The maximum value, on the other hand, is defined by the fact that the components ensure their resistance to failure only up to a certain torque. Because of this restriction, there is only a certain range within which the valve stroke can be finely adjusted. This range can be further restricted if the plastic deformation of the magnet sleeve occurs at lesser torques than $M_{max}$, and in that case the constant change in the stroke over time is no longer given.

The usable adjustment travel of the valve stroke, which is described by the above conditions, is not sufficiently long to make it possible to compensate for an error in the selection of the adjusting disk and variations in the rigidity of the magnet sleeve and in the moments of friction between the magnet adapter nut and the injector body or magnet sleeve. This in turn means that some fuel injectors cannot be adjusted to the target stroke and have to be removed. In particular, the range of the onset of plastic deformation in injectors at this time is at torques below the upper torque limit, which is defined by the strength of the other components. Designing the magnet sleeve for lesser rigidities and thus a wider adjustment range within the torque limits $M_{min}$ and $M_{max}$ leads in turn to a plastic deformation that begins even earlier.

OBJECT AND SUMMARY OF THE INVENTION

The present invention is based on the concept of using the adjustment range not only in the range of purely elastic deformation but also to shift or slightly increase the adjustment range toward shorter valve strokes by means of a targeted plastic deformation in the screwing operation. As a result, with an unmodified design of the magnet sleeve, a longer adjustment travel can be utilized, and the yield with regard to the target value of the fuel injectors in terms of their target stroke or closing duration can be increased.

Screwing of the magnet sleeve or the magnet assembly does not begin in the widely usual way with a setting course; that is, screwing of the magnet adapter nut with the maximum torques that occur is done without simultaneous valve stroke measurements. This is to anticipate possible plastic deformation at contact faces.

Upon initial tightening of the magnet adapter nut, screwing is already done at a constant, relatively slow rotational speed and a simultaneous, repeated measurement of the valve stroke and the closing duration. It is highly likely that plastic deformation will occur at high torques. Once a target stroke is attained, rotation continues at a differential torque $\Delta M_D$, which converted into axial force, assuming maximum friction, corresponds to the additional operating force from temperature influence. However, it is of lesser relevance whether the plastic range of the components occurs before or after the target stroke is reached, or not at all. The further rotation ensures that during operation, no higher axial forces than during the screwing operation will occur. The magnet sleeve does not plasticize again when these axial forces are attained again, because what is involved is not creep, that is, deformation under the influence of a constant load.

The magnet adapter nut is rotated in the unscrewing direction until the torque has reached a defined lower value that is less than $M_{min}$.

The magnet adapter nut is tightened a second time at a constant rotational speed while the valve stroke is simultaneously measured, until a target stroke is attained at $M_{d2}$. If the magnet sleeve upon initial tightening has entered the range of plastic deformation, then the value for $M_{d2}$ will be less than the value for $M_{d1}$. If the magnet sleeve does not plasticize, the two curves are located one above the other. Since in the second screwing operation a lesser axial force occurs than in the first screwing operation, no further plastic deformation occurs, and the curve of the valve stroke plotted on the torque has a constant slope.

In a stable process in mass production, in comparison to prior art processes, a larger adjusting disk is selected, to ensure that the valve stroke at the minimum torque $M_{min}$ will not be selected as too short. In the range of the upper torques, by targeted plasticizing of the magnet sleeve and attendant shortening of the length between the contact of the magnet core and the adjusting disk, its removal and the insertion of a thinner adjusting disk is substituted. Thus a wider adjustment range can be utilized, especially because the negative slope of the valve stroke/torque in the plastic range is quantitatively greater, and thus at small changes in the torque, major changes in the valve stroke can be performed.

The aforementioned elimination of the setting course that was previously necessary has the goal of not allowing the plasticizing and shortening of the magnet sleeve that occurs intentionally during the screw assembly to occur already before the actual screwing to the target stroke. Possibly, the selection of a particular adjusting disk can be dispensed with, and instead, an adjusting disk of standard thickness can be installed. The adjustment range then is utilized such that for each injector, the desired valve stroke can be set.

BRIEF DESCRIPTION OF THE DRAWINGS

The invention will be better understood and further objects and advantages thereof will become more apparent from the ensuing detailed description of preferred embodiments taken in conjunction with the drawing, in which.

DESCRIPTION OF THE PREFERRED EMBODIMENTS

Figure 1:
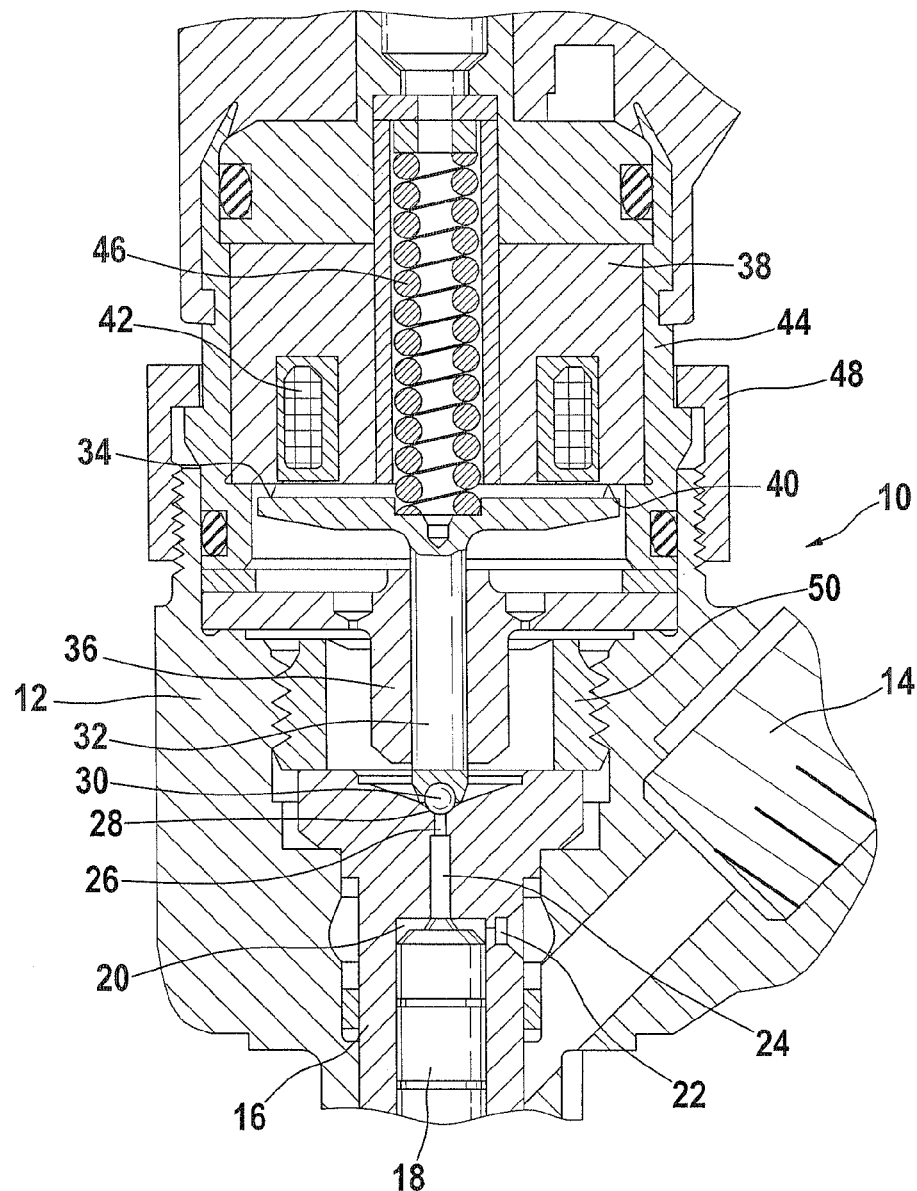
FIG. 1 shows a fuel injector in accordance with the prior art.

From the illustration in FIG. 1, a section can be seen through a fuel injector known from the prior art.

The fuel injector 10 shown in FIG. 1 includes an injector body 12, into which a high-pressure inlet 14 discharges laterally. Via the high-pressure inlet 14, fuel at system pressure is carried from a high-pressure reservoir chamber of a fuel reservoir injection system to the fuel injector 10. A valve piece 16, in which an injection valve member 18 or a pressure rod that actuates an injection valve member located farther below is received, is inserted in the injector body 12 of the fuel injector 10. A control chamber 20 is embodied in the valve piece 16 and is acted upon, via an inlet throttle restriction 22, by the fuel at system pressure as it emerges from the inlet 14. The control chamber 20 and the valve piece 16 can be pressure-relieved via an outlet conduit 24. An outlet throttle restriction 26 is located in the outlet conduit 24 below the orifice of the outlet conduit, that is, below a valve seat 28. The valve seat 28 of the outlet conduit 24 is closed by a closing element 30, which in the illustration in FIG. 1 is embodied in the form of a ball.

The fuel injector 10 is actuated by means of a solenoid valve. A magnet assembly of the solenoid valve includes an armature 32, which is guided in an armature guide 36. The armature guide 36 is in turn surrounded by a valve set screw 50 with which the valve piece 16 is installed in the injector body 12 of the fuel injector 10.

The armature 32 has a plane face 34, which points toward a plane side 40 of a magnet core 38. The magnet core 38 includes a magnet coil 42. The magnet assembly, which includes the magnet core 38, the magnet coil 42, and the armature 32, is surrounded by a magnet sleeve 44, which is screwed to the injector body 12 by means of a magnet adapter nut 48.

From the illustration in FIG. 1 it can be seen that the armature is acted upon by a valve spring 46 and pressed into the valve seat 28. Not until current is supplied to the magnet coil 42 received in the magnet core 38 does opening of the valve seat 28 occur, by attraction of the plane face 34 of the armature 32.

Figure 2:
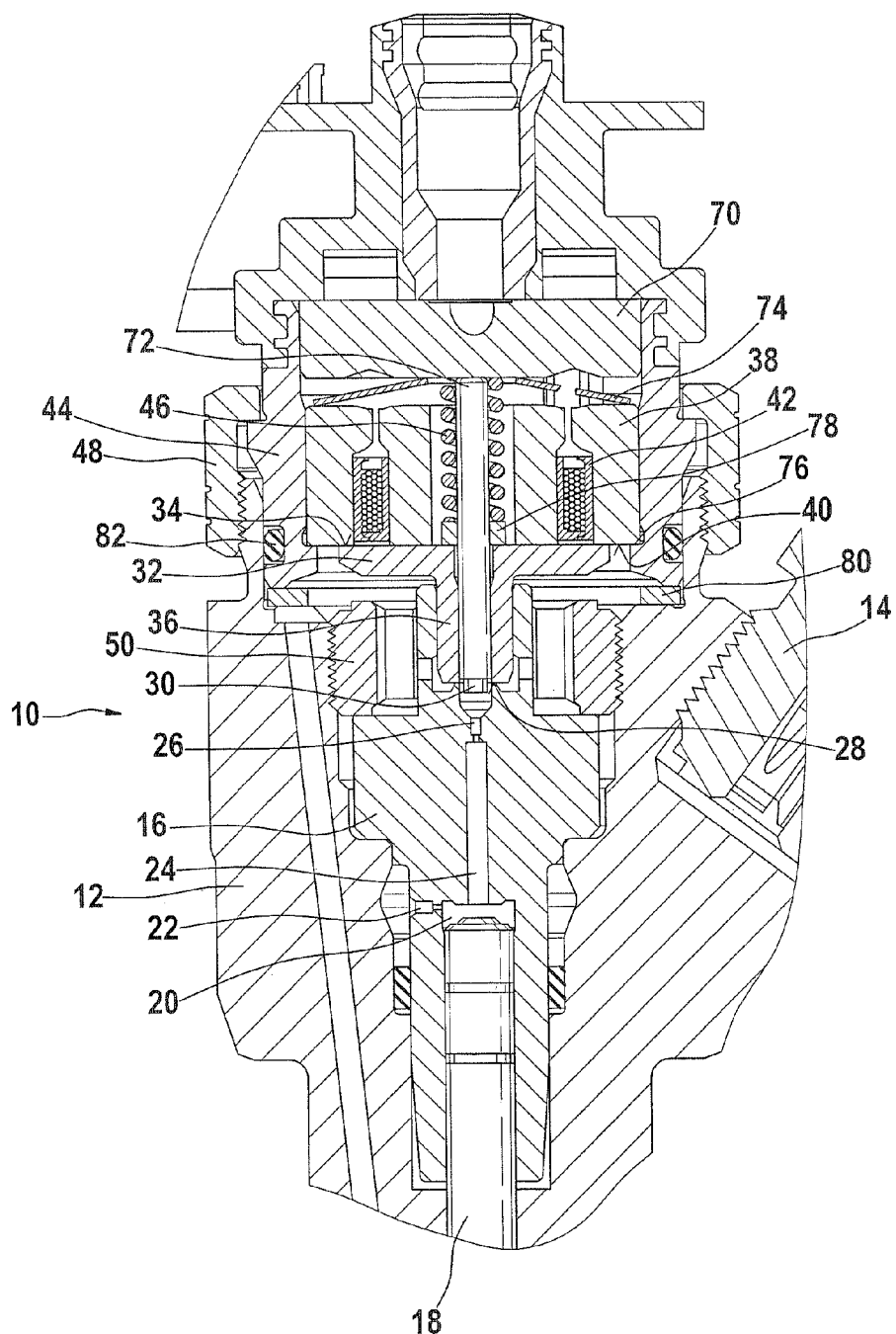
FIG. 2 is a section through a fuel injector with a limitation of the valve stroke by the pole face of the magnet core.

FIG. 2 shows a longitudinal section through a fuel injector, in which an attracted magnet sleeve is used in the context of a magnet assembly of a solenoid valve.

It can be seen from the illustration in FIG. 2 that analogously to the fuel injector 10 of FIG. 1 known from the prior art, the fuel injector 10 shown in FIG. 2 includes a magnet core 38, which is positioned by a cup spring 74, serving here as a positioning spring, against an encircling shoulder 76 of the magnet sleeve 44. The cup spring 74 is braced on a pressure piece 70, on which both the valve spring 46 and a pressure pin 72 are braced. The valve spring 46 is braced on a spring force adjusting disk 78; the armature 32 is guided both at the pressure pin 72 and in an armature guide 36, which extends outward from the top of the valve piece 16. In the view in FIG. 2, the tip of the armature 32 closes the valve seat 28 on the top of the outlet conduit 24 in which the outlet throttle restriction 26 is received. The control chamber 20 is located on the lower end of the outlet conduit 24 and is subjected to fuel at system pressure through the inlet throttle restriction 22 analogously to what is shown in FIG. 1.

An elastically deformable sealing ring 82 is located on the outside of the magnet sleeve 44. Next to the valve set screw 50 is an adjusting disk 80, on which the magnet sleeve 44 that can be screwed to the injector body 12 by the magnet adapter nut 48 stands.

Figure 3:
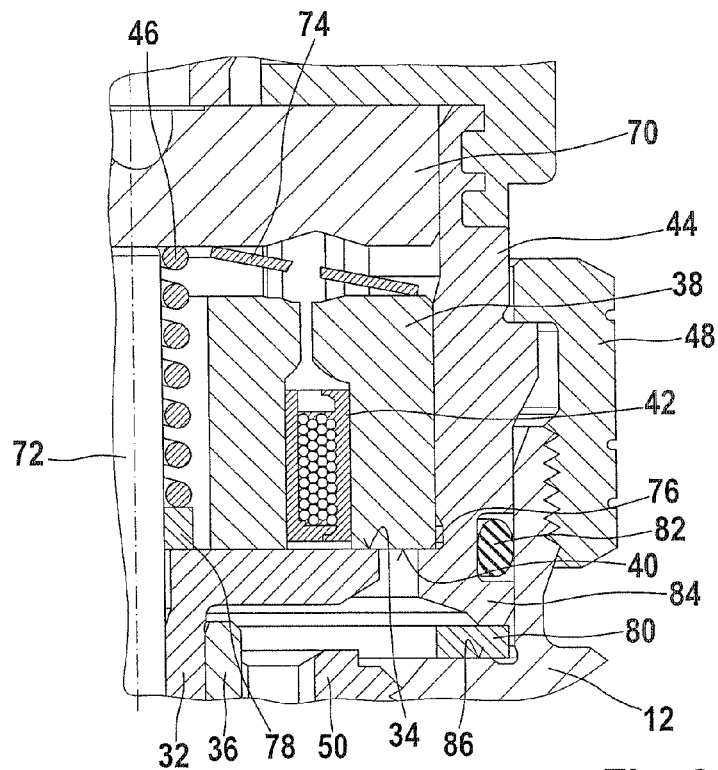
FIG. 3 shows a variant embodiment of an elastically embodied sleeve.

In FIG. 3, an enlarged detail of the magnet assembly of the solenoid valve for actuating the fuel injector of FIG. 2 can be seen.

FIG. 3, in an enlarged view, shows the pressure pin 72, which is braced on the pressure piece 70 and which in turn serves as a guide for the armature 32. The armature guide 36 is shown only partially in the enlarged view in FIG. 3. The valve set screw 50 with which the valve piece 16 and the armature guide 36 are secured in the injector body 12 is shown only partially in the enlarged view in FIG. 3. From FIG. 3, it can be seen that the injector body 12 of the fuel injector 10 includes a contact face 86 that has a plane course. An adjusting disk 80 for adjusting the valve stroke $h_V$ is received on this contact face. The magnet sleeve 44 surrounding the magnet assembly is braced with an encircling shoulder 84 on the top of the adjusting disk 80. This encircling shoulder 84 acts as an elastic collar, at which the elastic or combined elastic-plastic or purely plastic deformation is established. The initial tension between the adjusting disk 80 and thus the valve stroke between the armature 32 in relation to the plane side 40 of the magnet core 38 is defined on the one hand by the thickness of the adjusting disk 80 and on the other by the amount of elastic or plastically unbeddable deformation of the encircling shoulder 84 on the lower face end, pointing toward the adjusting disk 80, of the magnet sleeve 44. The initial tension between the magnet sleeve 44 and the adjusting disk 80 in the injector body 12 is adjusted by the attraction torque that is exerted on the magnet adapter nut 48. It can furthermore be seen from FIG. 3 that the magnet sleeve 44 is sealed off from the injector body 12 via the elastically deformable sealing ring 82. The magnet coil 42 is received in the magnet core 38 of the magnet assembly; the magnet core 38 is also provided with a through opening, through which the valve spring 46 extends. By means of a positioning spring 74, embodied as a cup spring, the magnet core 38 is pressed against the steplike shoulder 76 on the underside of the magnet sleeve 44.

The pressure pin 72 braced on the pressure piece 70 simultaneously acts as a guide for the valve spring 46 that acts on the spring force adjusting disk 78 on the top of the armature 32. This guidance of the valve spring 46 prevents the spring from kinking.

Figure 4:
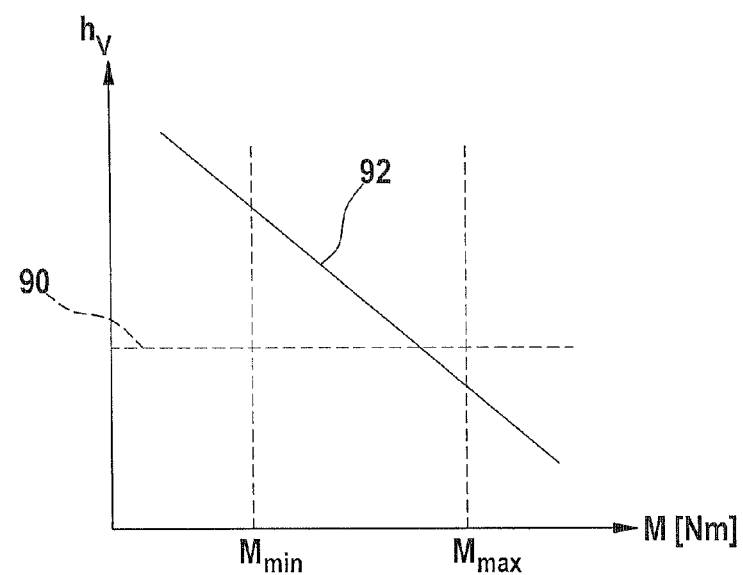
FIG. 4 is a graph of a purely elastically proceeding deformation of the magnet sleeve, with the valve stroke plotted over the torque of the adapter nut.

FIG. 4 shows the course of a purely elastic deformation of the magnet sleeve.

In the illustration in FIG. 4, the valve stroke $h_V$ is plotted over the torque M that is exerted on the magnet adapter nut 48. As FIG. 4 shows, a linear relationship identified by reference numeral 92 results. The straight line extending between a torque $M_{min}$ and a torque $M_{max}$ represents Hooke's straight line. This line intersects a target stroke 90 that is to be established upon screwing of the screw assembly comprising the injector body 12, the magnet sleeve 44, the magnet core and the armature, and that is constantly monitored for attainment during the screwing operation. In the joining of the magnet sleeve 44, magnet core 38 and magnet coil 42, the magnet adapter nut 48 is screwed on at a constant rotational speed, while simultaneously, the stroke duration or closing duration of the solenoid valve is measured. The closing duration is the time that elapses from the shutoff of the coil current until the valve element strikes the sealing seat. Measuring the closing duration partly replaces measuring the valve stroke $h_V$, since in certain types of fuel injectors 10, the valve stroke can no longer be measured in the installed state. The change in the valve stroke $h_V$ or in the closing duration of the solenoid valve over time should be virtually constant, at a constant rotational speed of the magnet adapter nut 48, so that the device for screwing the magnet adapter nut 48 will recognize the attainment of the target stroke 90 in good time and the screwing operation can be terminated. This can then be ensured if the deformation of the magnet sleeve 44 is a purely elastic deformation, represented by the course 92 in FIG. 4.

The values $M_{min}$ and $M_{max}$ shown in FIG. 4 for the attraction torque of the magnet adapter nut form the peripheral conditions in the screwing operation. The minimum value of the attraction torque $M_{min}$ is defined by the fact that independent loosening of the valve adapter nut 48 in operation at overly low breakaway torques must be prevented. The maximum value $M_{max}$ for the attraction torque of the magnet adapter nut is defined by the fact that the components ensure their resistance to failure up to a defined torque. Because of this restriction, there is only a certain range within which the valve stroke $h_V$ can be finely adjusted.

Figure 5:
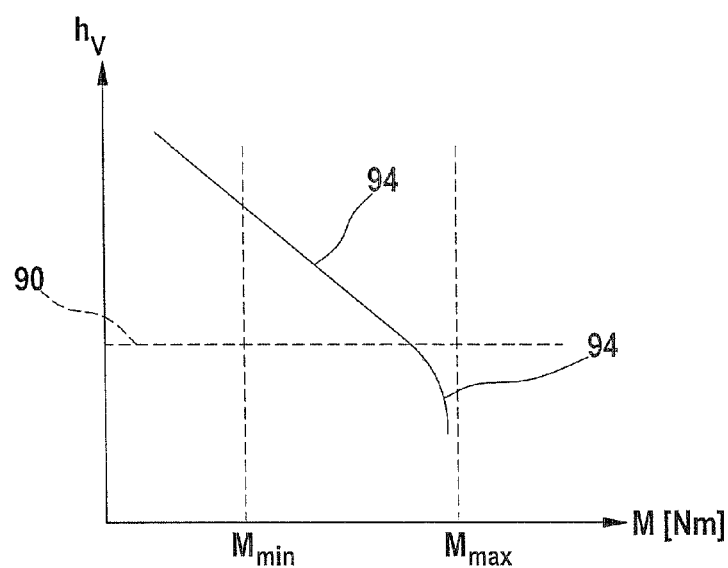
FIG. 5 shows the course of an elastic-plastic deformation of the magnet sleeve, again with the valve stroke plotted over the torque of the adapter nut.

From the graph in FIG. 5, it can be seen that the range between $M_{min}$ and $M_{max}$ relative to the attraction torque of the magnet adapter nut 48 can experience a restriction, if a plastic deformation 98 as represented by curve course 94 in FIG. 5 is present. A plastic deformation 98 of the magnet adapter nut 48 can certainly occur at lesser torques, below the maximum torque $M_{max}$, so that there is not a constant change in the valve stroke $h_V$ over time.

Figure 6:
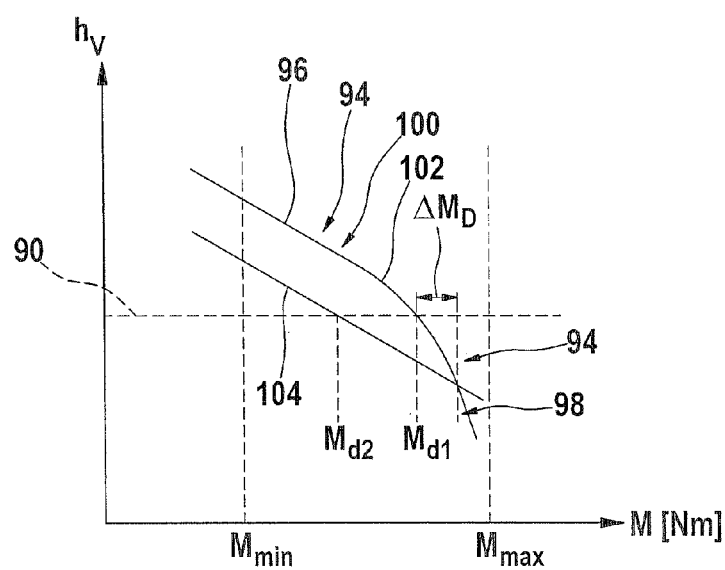
FIG. 6 shows the course of a beginning plastic deformation—shown similarly to FIG. 5—in which the valve stroke is plotted over the torque of the adapter nut.

FIG. 6 shows the ensuing plastic or elastic deformations with respect to the magnet sleeve, receiving the magnet assembly, of the fuel injector of FIG. 2.

From the graph in FIG. 6, it can be seen that the valve stroke $h_V$ is plotted over the attraction torque of the magnet adapter nut 48.

With the screwing method proposed according to the invention, the adjustment range can be utilized not only in the range of the purely elastic deformation 92 but can also be shifted toward shorter valve strokes $h_V$ or slightly increased by applying a targeted elastic-plastic deformation 94 during the screwing operation. With an unmodified design of the magnet sleeve 44, a longer adjustment travel can thus be utilized, and the yield of good parts with respect to the target value in relation to the valve stroke $h_V$ can be increased considerably.

In accordance with screwing methods proposed according to the invention, the screwing of the magnet assembly received in the magnet sleeve 44 by the magnet adapter nut 48 on the injector body 12 is not done, as is generally usual, with a setting course. This means that screwing the magnet adapter nut 48 with maximal incident torques does not occur without simultaneous valve stroke measurement. Until now, the setting course was necessary in order to anticipate any possible plastic deformations at the contact faces. One contact face that could be subjected to a plastic deformation is for example the contact face 86 of the injector body 12, on which the adjusting disk 80 is mounted.

In the method proposed according to the invention, first, a first screwing course 102 is performed, which is done at constant, relatively low rotational speed of the screwing tool; simultaneously, a constantly repeated measurement of the valve stroke $h_V$ and of the closing duration is done. In this first screwing course 102, an elastic-plastic deformation 94 occurs, which both has an elastic range 96, namely Hooke's straight line, and also includes a range 98 in which a plastic deformation of the magnet sleeve 44 is present. A beginning, at which the elastic range 96 changes over to the plastic range 98, is represented in the drawing in FIG. 6 by reference numeral 100. At high torques greater than or equal to $M_{min}$ relative to the attraction torque of the magnet adapter nut, plastic deformation 98 of the magnet sleeve 44 quite far radially outward is highly likely, in particular inside an elastic collar, above an O-ring groove and the contact face 86 of the magnet sleeve 44. This elastic collar bends primarily in the thin-walled cross section and thus shortens the region of the magnet sleeve 44 below the shoulder 76 of the magnet core 38 of the magnet assembly.

Upon attainment of the target stroke 90 during the first screwing course, a well-defined attraction torque $M_{d1}$ is present. Once the target stroke 90 is reached, this first defined attraction torque of the magnet adapter nut 48 is increased by a differential torque $\Delta M_D$. Converted, this corresponds to an axial force, assuming maximum friction and the additional force that occurs in operation of the fuel injector 10 because of rising temperatures. In the present situation, it does not matter whether the plastic range 98 is reached or not before or after the target stroke 90 is attained. The magnet sleeve 44 does not plasticize again if these high axial forces are reached again, since the present plastic deformation 98 is not creepage, or in other words deformation at constant load.

Next, loosening of the magnet adapter nut 48 in the unscrewing direction is done, until the attraction torque reaches a defined lower value, which is less than the attraction torque $M_{min}$.

In an ensuing further screwing course 104, retightening of the magnet adapter nut 48 takes place at constant rotational speed of the tightening tool, with simultaneous measurement of the valve stroke $h_V$, until the target stroke, that is, the target stroke 90, is reached. However, that target stroke is already reached in the second screwing course 104 at a second attraction torque $M_{d2}$. For the case in which the magnet sleeve 44 has reached the range of the plastic deformation 94 in the first screwing course 102, as a rule the second attraction torque $M_{d2}$ will be less than the first attraction torque $M_{d1}$ of the magnet adapter nut 48. If the magnet sleeve 44 in the region of the elastic collar 84 does not plasticize, then both curves are located one above the other. Since a lesser axial force occurs in the second screwing course 104 than in the first screwing course 102, as a result of the differential torque $\Delta M_D$ in the first screwing course 102, no further plastic deformation 98 occurs, and the curve of the valve stroke $h_V$, plotted over the attraction torque, has a constant slope.

With the method proposed according to the invention in comparison to prior art processes, in stable screwing processes in mass production, a larger adjusting disk 80, or in other words a thicker adjusting disk 80, is selected, thus ensuring that the valve stroke $h_V$ at minimum torque $M_{min}$—see the graph in FIG. 6—is not too short. In the range of higher torques, in which the attraction torque of the magnet adapter nut 48 is above the minimum value $M_{min}$, removing the adjusting disk and inserting a thinner adjusting disk 80 is avoided by targeted plasticizing of the magnet sleeve 44 and an attendant shortening of the length between the contact 96 of the magnet core 38 and the adjusting disk 80. Thus a considerably wider adjustment range can be utilized, especially because the negative slope of the valve stroke $h_V$ plotted over the attraction torque in the plastic range 98 becomes quantitatively greater, and thus at small changes in the attraction torque of the magnet adapter nut 48, major changes in the valve stroke $h_V$ can be attained.

Eliminating the setting course as mentioned at the outset has the effect that the targeted plasticizing and shortening of the magnet sleeve 44, which occur during the screwing operation, do not occur even before the actual screwing to the point where the target stroke 90 is present. In certain cases, the selection of a particular adjusting disk 80 can be dispensed with, and instead an adjusting disk 80 of standard thickness can be installed. Then, the adjustment range is utilized such that for every fuel injector, the desired valve stroke $h_V$, that is, the target stroke 90, can be set accordingly.

Figure 7:
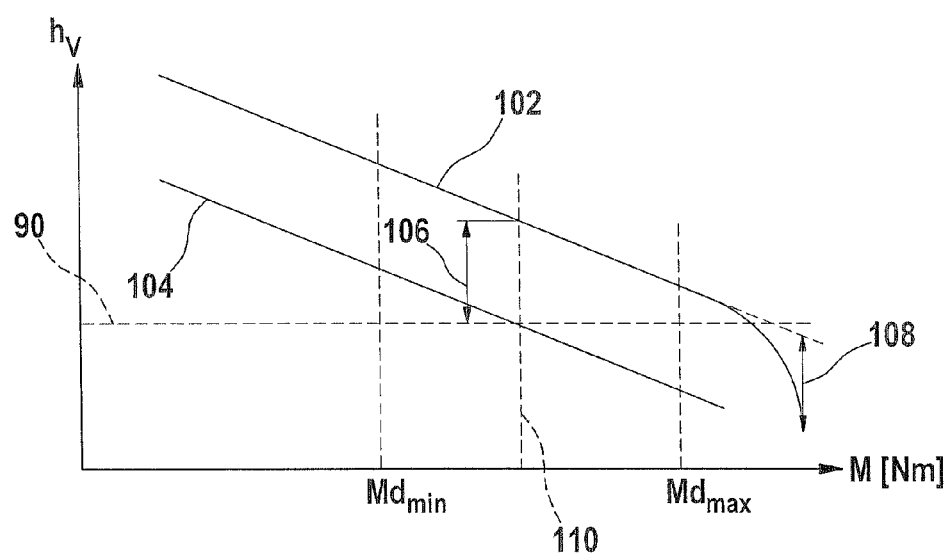
FIG. 7 shows a target closing duration of the solenoid valve that ensues when there is identity between the calculated and the actual plastic deformation of the magnet sleeve.

From the graph in FIG. 7, the attainment of a target closing duration can be seen, which occurs upon identity of a calculated plastic deformation and an actually measured plastic deformation.

FIG. 7 shows the closing duration $S_D$, which corresponds to the valve stroke $h_V$, plotted over the attraction torque that acts on the magnet adapter nut.

The magnet assembly is screwed onto the fuel injector 10 without a preliminary setting course, which would tend to involve selecting an overly large or in other words overly thick adjusting disk 80. During the first screwing course 102, at the mean torque, that is, when a center 110 of the torque window between $M_{dmin}$ and $M_{dmax}$ is reached, the closing duration is measured, and any difference compared to the target closing duration is calculated. This difference should be represented by a targeted plasticizing of the sleeve. This calculated requisite plastic deformation for attaining the target closing duration is represented in FIG. 7 by reference numeral 106. After the end of the first screwing course 102, an actually adjusted plastic deformation 108 of the magnet sleeve 44, particularly in the vicinity of the encircling shoulder 84 that represents the elastic plastically deformable collar is measured. The actual plasticizing 108 is measured at very high attraction torques or is calculated from the state of the screwdriving tool that results from a deviation in the closing duration curve, over the course of torque, from the straight line that represents the purely plastic deformation. The thus-deformed magnet sleeve 44 makes it possible to reach the target closing duration precisely at the center 110 of the torque window between the minimum torque $M_{min}$ of the valve adapter nut and the maximum torque $M_{max}$ of the valve adapter nut.

During the second screwing course 104 (FIG. 7), the solenoid valve 48 is tightened until the target closing duration is reached. After that, the adjustment of the closing duration is concluded.

The foregoing relates to preferred exemplary embodiments of the invention, it being understood that other variants and embodiments thereof are possible within the spirit and scope of the invention, the latter being defined by the appended claims.

I claimed:

1. A method for adjusting the valve stroke or a closing duration of a solenoid valve for actuating a fuel injector, comprising the following steps:
    a) screwing a magnet adapter nut in a first screwing course on an injector body to couple a magnet sleeve to the injector body until a target stroke is reached at a first torque $M_{d1}$;
    b) on attainment of the target stroke at the first torque $M_{d1}$, effecting a further rotation of the magnet adapter nut with a differential torque $\Delta M_D$, wherein the differential torque $\Delta M_D$ corresponds to an axial force which comprises maximum friction and an operating force based on a temperature influence;
    c) loosening the magnet adapter nut, until a torque $M_{min}$ is undershot; and
    d) rescrewing the magnet adapter nut in a second screwing course until the target stroke is reached at a second torque $M_{d2}$.

2. The method as defined by claim 1, wherein in the method of step a), an elastic-plastic deformation is executed, in which the magnet sleeve on an elastic collar is at least partially plasticized, or an elastic deformation is attained, if at a total torque of the first torque $M_{d1}$ plus the differential torque $\Delta M_D$, no plastic deformation occurs.

3. The method as defined by claim 2, wherein the partial plasticizing of the magnet sleeve is effected in a vicinity of an encircling shoulder.

4. The use of the method as defined by claim 3 for installing a solenoid valve on a fuel injector.

5. The use of the method as defined by claim 2 for installing a solenoid valve on a fuel injector.

6. The method as defined by claim 1, wherein during execution of method step d), another axial force is attained which is less than the axial force which is generated in method step b) at a total torque comprising the first torque $M_{d1}$ and the differential torque $\Delta M_D$, and a plastic deformation of the magnet sleeve does not occur during operation of the fuel injector.

7. The use of the method as defined by claim 6 for installing a solenoid valve on a fuel injector.

8. The method as defined by claim 1, wherein between the injector body and the magnet sleeve, an adjusting disk is placed, which ensures that at attraction torques $M_{min}$ of the magnet adapter nut, a valve stroke occurs which is greater than the target stroke.

9. The use of the method as defined by claim 8 for installing a solenoid valve on a fuel injector.

10. The method as defined by claim 1, wherein in the screw assembly comprising the injector body and the magnet adapter nut, at attraction torques m>$M_{min}$, by plastic deformation of the magnet sleeve, shortening of the length between a contact of the magnet core and the adjusting disk is attained.

11. The use of the method as defined by claim 10 for installing a solenoid valve on a fuel injector.

12. The method as defined by claim 1, wherein a negative position between a valve stroke and an attraction torque M of the magnet adapter nut in the plastic range is quantitatively larger, and at lesser changes in the attraction torque M, greater changes in the valve are attained.

13. The use of the method as defined by claim 12 for installing a solenoid valve on a fuel injector.

14. The method as defined by claim 1, wherein plasticization and shortening of the magnet sleeve that are attainable during method step a) take place in the screwing to the target stroke.

15. The use of the method as defined by claim 14 for installing a solenoid valve on a fuel injector.

16. The method as defined by claim 1, wherein in a first screwing course, a requisite plastic deformation of the magnet sleeve, calculated at a mean attraction torque $M_d$, for attaining a target closing duration, is identical to an actually measured plastic deformation of the magnet sleeve in the plastic range, and the magnet sleeve thus plastically deformed makes it possible to attain the target closing duration in the center of the torque window.

17. The use of the method as defined by claim 16 for installing a solenoid valve on a fuel injector.

18. The use of the method as defined by claim 1 for installing a solenoid valve on a fuel injector.

* * * * *